Patented July 11, 1939

2,165,834

UNITED STATES PATENT OFFICE 2,165,834

WATER-RESISTANT, STARCH-CONTAINING, PRODUCT AND METHOD

Harold E. Bode, Chicago, Ill., assignor, by mesne assignments, to Corn Products Refining Company, New York, N. Y., a corporation of New Jersey No Drawing. Application September 20, 1937, Serial No. 164,796

6 Claims. (Cl. 134—16)

This invention relates to the production of water-immiscible or water-resistant substances, such as water resistant coatings, paint, lacquer, varnish, greases and the like, and the principal object of the invention is to provide substances of the nature described in which one of the ingredients is starch.

Another object is to provide a starch paste which is devoid of water, and, for that reason, is particularly adapted for use as a filler, gel or thickening agent for water-immiscible substances.

Further objects will more fully appear from the following detailed description.

Starch has heretofore been extensively utilized as a filler, gel or thickening agent in water-miscible substances and the high qualities of starch or starch paste for such purposes are well recognized. However, until the present time no satisfactory method has been devised for utilizing these qualities of starch in the field of water-immiscible substances, such as above described.

The primary reason for the non-use of starch in this field is that starch, even in an air dry state, contains from 5% to 15% or more moisture, depending upon the type of starch and the atmospheric conditions. Consequently if ordinary air dried starch were mixed with a water immiscible substance, such as paint, for example, the moisture content in the starch would resist mixing with the ingredients of the paint and destroy the value of the product.

The present invention contemplates the introduction into water-immiscible substances of starch which is in a dehydrated condition, that is, starch which has substantially zero water content and has been treated to render it relatively stable in the presence of air.

The production of a dehydrated and relatively stable starch, such as is utilized in carrying out the present invention, is fully described in my copending application Serial No. 159,382, filed August 16, 1937 and consists briefly, in drying starch to substantially zero moisture content, preferably under vacuum, and then treating the dehydrated starch, in the absence of atmospheric or other water moisture, with a starch inert, water-immiscible liquid, such as a chlorinated hydrocarbon, whereby the water immiscible liquid is adsorbed into the starch to form a relatively stable, anhydrous starch product. The preferred adsorption liquid is propylene dichloride, although other chlorinated hydrocarbons and other liquids such as benzene, solvent naphtha, toluol and the like may be employed.

An illustrative example of the production of the dehydrated starch, according to the aforementioned copending application is as follows:

11.2 grams of starch were vacuum dried to constant weight. To the resulting 10.2 grams of dry anhydrous starch was added 2.3 grams of propylene di-chloride which was thereupon rapidly adsorbed into the dry starch, care being exercised during the addition of the propylene di-chloride to avoid the access of air. The resulting powder of starch-propylene di-chloride, when spread on a shallow tray and allowed to stand at room temperature with thorough air exposure, showed no increase of weight, i. e. no adsorption of moisture from the air, for thirty hours. As soon as the propylene di-chloride had volatilized the starch began to take up moisture from the air.

According to the present invention the dehydrated starch, produced as above briefly described, is first treated to form an anhydrous starch paste, in which form it is adapted for mixing with various water-immiscible substances.

For this purpose it has been found that various free, organic liquids such as alkyl-, aryl-, and heterocyclic amines, chloral and the like are starch swelling agents, that is, they possess the power of making the starch gel and form a paste.

The following two examples illustrate the use of chloral and a heterocyclic amine, respectively, in the pre-treatment of the starch to form a water-free starch paste.

Example 1

Into 10 parts of dehydrated starch (into which has been adsorbed approximately 10% by weight of propylene dichloride) thoroughly mix 100 parts of chloral at room temperature. The chloral will react with the starch to gelatinize the same to form a water-free, chloral-starch paste. If desired, the mixture can be heated to 212° F. to distill off the propylene dichloride.

Example 2

Into 64 parts of dehydrated starch (of the character described in Example 1) thoroughly mix 100 parts of pyridin at room temperature. The pyridin will react with the starch to gelatinize the same to form a water-free, pyridin-starch paste. As stated in Example 1, the propylene dichloride may be driven off by heating, if desired.

The starch paste thus obtained by the procedures above outlined is suitable for general use in the water immiscible field. Since pyridin and other of the above named reagents, such as formamide, and chloral, are also miscible with both fat and resin solvents, a paste made with any of said reagents in the manner described in this example is readily adaptable for use as an ingredient in paint, lacquer, varnish, plastics and the like. A paste made with a reagent which is not miscible with fat or resin solvents may be employed to advantage in the production of an adhesive.

A specific example of the use of the above paste in the production of a paint is as follows:

*Example 3*

| | Percent |
|---|---|
| Anhydrous starch paste (Example 1) | 10 |
| White lead | 30 |
| Zinc oxide | 25 |
| Linseed oil | 30 |
| Turpentine | 4 |
| Drier, such as litharge | 1 |

These ingredients are thoroughly intermixed and the resulting paint will be found to have superior qualities in several respects. The starch content not only serves as a mere filler, but gives the product a good body, increased adherence, and excellent texture.

In like manner similar results will be obtained by mixing anhydrous starch with other water-immiscible substances such as lacquers, varnish, plastics and the like. The principal consideration in each case should be that the liquids mixed with the starch before compounding shall be miscible with the other ingredients of the compound. The ratio between starch and the other substances will, of course, vary with different materials.

For certain purposes the dehydrated starch may be compounded with other water-immiscible substances without first forming an anhydrous starch paste. The following examples illustrate the mixing of dehydrated starch in its dry state with water-immiscible substances.

*Example 4*

Mixing together 90 parts of white petroleum jelly, 30 parts kieselguhr and 10 parts of anhydrous starch, into which has been adsorbed propylene di-chloride in an amount approximately 10% by weight of the starch.

The propylene di-chloride, being a solvent for the petroleum jelly, will facilitate an intimate blend between the various ingredients. Preferably the ingredients are thoroughly intermixed and then, if desired, the propylene di-chloride can be driven off by heating.

The resulting product will possess superior qualities as a polish.

*Example 5*

Mix together, in a manner specified in Example 1, 150 parts mineral oil, 15 parts of ceresine wax and 5 parts of dehydrated starch, into which has been adsorbed tri-chlor-ethylene in an amount of approximately 10% by weight of the starch.

The resulting product is an excellent lubricant for general purposes.

The above examples are merely illustrative and it is the intention to cover all modifications and variations thereof within the scope of the appended claims.

I claim:

1. A water-free, water-resistant starch paste comprising a mixture of dehydrated starch having adsorbed therein a water-immiscible liquid which is relatively volatile, organic and neutral in reaction, and an organic starch swelling agent which is miscible with said water immiscible liquid, the swelling agent being of the group consisting of alkyl, aryl and heterocyclic amines and chloral.

2. A water-free, water-resistant starch paste comprising a mixture of substantially 64 parts dehydrated starch having adsorbed therein a water-immiscible liquid which is relatively volatile, organic and neutral in reaction, and substantially 100 parts of an organic starch swelling agent which is miscible with said water-immiscible liquid, the swelling agent being of the group consisting of alkyl, aryl and heterocyclic amines and chloral.

3. Method of making a water-free starch paste which comprises mixing dehydrated starch having a water-immiscible liquid adsorbed therein with a water-free organic reagent miscible with said water immiscible liquid and capable of swelling the starch, said reagent being of the group consisting of alkyl, aryl and heterocyclic amines and chloral and said water immiscible liquid being organic relatively volatile and neutral in reaction.

4. Method of making a water-free starch paste which comprises mixing substantially 65 parts of a dehydrated starch, having a water-immiscible liquid adsorbed therein, with substantially 100 parts of an organic reagent miscible with said water immiscible liquid and capable of swelling the starch, said reagent being of the group consisting of alkyl, aryl and heterocyclic amines and chloral and said water immiscible liquid being organic relatively volatile and neutral in reaction.

5. Method of making a water-free starch paste which comprises mixing dehydrated starch having a water-immiscible liquid adsorbed therein with an organic reagent which is capable of gelatinizing starch and is miscible with fat and resin solvents, said reagent being of the group consisting of alkyl, aryl and hererocyclic amines and chloral and said water immiscible liquid being organic relatively volatile and neutral in reaction.

6. Method of making a water-free starch paste which comprises mixing dehydrated starch having a water immiscible liquid adsorbed therein with an amine of the group consisting of alkyl, aryl and heterocyclic amines said water-immiscible liquid being organic, neutral in reaction and relatively volatile.

HAROLD E. BODE.